United States Patent [19]
Taylor

[11] Patent Number: 5,853,180
[45] Date of Patent: Dec. 29, 1998

[54] TOOL BOX CADDY

[76] Inventor: Lionel C. Taylor, 19744 Alonda Dr., Carson, Calif. 90746

[21] Appl. No.: 18,988

[22] Filed: Feb. 5, 1998

[51] Int. Cl.$^6$ ................................................. B25H 5/00
[52] U.S. Cl. ................... 280/32.6; 280/47.34; 280/47.35
[58] Field of Search ............................... 280/32.6, 47.34, 280/47.35, 79.2, 79.3, 79.11, 87.01; 446/428, 78, 426; D21/425, 595

*Primary Examiner*—D. Glen Dayoan
*Assistant Examiner*—Clovia Hamilton

[57] ABSTRACT

A tool transport assembly is provided including a base having a swivel wheel mounted to each of the corners thereof for transporting purposes. A first side portion of the assembly includes a peripheral lip coupled thereto and extending upwardly therefrom a first predetermined height for defining a shallow compartment with an open top. Also included is a second side portion having at least one side wall defining an open top. The side wall is equipped with a height at least four times the first predetermined height.

9 Claims, 3 Drawing Sheets

TOOL BOX CADDY

BACKGROUND OF THE INVENTION

1. Field of the Invention

The present invention relates to wheeled tool boxes and more particularly pertains to a new tool box caddy for conveniently transporting tools and various other entities.

2. Description of the Prior Art

The use of tool boxes is known in the prior art. More specifically, tool boxes heretofore devised and utilized are known to consist basically of familiar, expected and obvious structural configurations, notwithstanding the myriad of designs encompassed by the crowded prior art which have been developed for the fulfillment of countless objectives and requirements.

Known prior art tool boxes include U.S. Pat. No. 4,119,044; U.S. Pat. No. 4,923,202; U.S. Pat. Des. 361,420; U.S. Pat. No. 4,715,573; U.S. Pat. No. 4,632,410; and U.S. Pat. No. 4,240,684.

In these respects, the tool box caddy according to the present invention substantially departs from the conventional concepts and designs of the prior art, and in so doing provides an apparatus primarily developed for the purpose of transporting tools and various other entities.

SUMMARY OF THE INVENTION

In view of the foregoing disadvantages inherent in the known types of tool boxes now present in the prior art, the present invention provides a new tool box caddy construction wherein the same can be utilized for transporting tools and various other entities.

The general purpose of the present invention, which will be described subsequently in greater detail, is to provide a new tool box caddy apparatus and method which has many of the advantages of the tool boxes mentioned heretofore and many novel features that result in a new tool box caddy which is not anticipated, rendered obvious, suggested, or even implied by any of the prior art tool boxes, either alone or in any combination thereof.

To attain this, the present invention generally comprises a horizontally oriented base having a planar rectangular configuration with a top face, a bottom face and a periphery formed therebetween. Such periphery is defined by a pair of parallel elongated edges and a pair of parallel short edges formed therebetween. The bottom face further includes a swivel wheel mounted to each of the corners thereof for transporting purposes. To further facilitate transporting of the present invention, a rope is connected to the bottom face of the base adjacent to one of the short edges and terminating in a loop. As shown in FIG. 2, a first side portion is provided including a peripheral lip coupled thereto and extending upwardly therefrom a first predetermined height. Associated therewith is an intermediate lip integrally coupled to the top face of the base and extended upwardly therefrom the first predetermined height. The intermediate lip is situated in parallel relationship with and adjacent to a portion of the peripheral lip mounted along one of the elongated edges of the base. The lips define a first shallow compartment with an open top and a first width and a second shallow compartment with an open top and a second width less than ¼ the first width. See FIG. 1. Situated opposite the first side portion is a second side portion having a pair of square side walls each having a square horizontal cross section. The square side walls are situated in a side-by-side relationship between the elongated edges and contiguous with one of the short edges of the base. The square side walls each define an open top and a separate compartment. The square side walls include a short side wall and a tall side wall. The tall side wall is equipped with a height at least twice that of the short side wall and at least four times the first predetermined height. It should be noted from the Figures that a length of the second side portion is less than ¼ that of the first side portion. Finally, a square lid has a first side edge hingably coupled to an upper peripheral edge of the open top of the tall side wall for pivoting between an opened and a closed orientation. The square lid has a cylindrical recess formed therein for containing a beverage or the like therein.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tool box caddy apparatus and method which has many of the advantages of the tool boxes mentioned heretofore and many novel features that result in a new tool box caddy which is not anticipated, rendered obvious, suggested, or even implied by any of the prior art tool boxes, either alone or in any combination thereof.

It is another object of the present invention to provide a new tool box caddy which may be easily and efficiently manufactured and marketed.

It is a further object of the present invention to provide a new tool box caddy which is of a durable and reliable construction.

An even further object of the present invention is to provide a new tool box caddy which is susceptible of a low cost of manufacture with regard to both materials and labor, and which accordingly is then susceptible of low prices of sale to the consuming public, thereby making such tool box caddy economically available to the buying public.

Still yet another object of the present invention is to provide a new tool box caddy which provides in the apparatuses and methods of the prior art some of the advantages thereof, while simultaneously overcoming some of the disadvantages normally associated therewith.

Still another object of the present invention is to provide a new tool box caddy for transporting tools and various other entities.

Even still another object of the present invention is to provide a new tool box caddy that includes a base having a swivel wheel mounted to each of the corners thereof for transporting purposes. A first side portion of the assembly includes a peripheral lip coupled thereto and extending upwardly therefrom a first predetermined height for defining a shallow compartment with an open top. Also included is a second side portion having at least one side wall defining an open top. The side wall is equipped with a height at least four times the first predetermined height.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
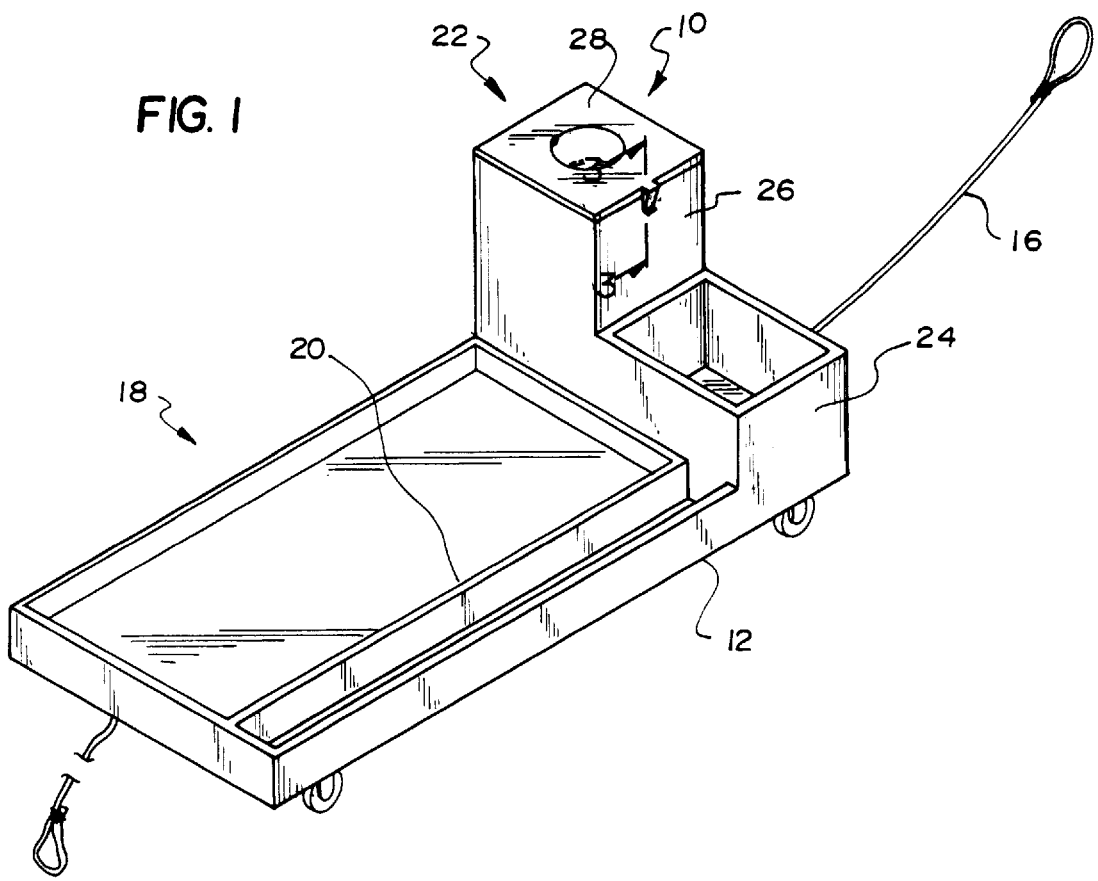
FIG. 1 is a perspective view of a new tool box caddy according to the present invention.

With reference now to the drawings, and in particular to FIGS. 1 through 6 thereof, a new tool box caddy embodying the principles and concepts of the present invention and generally designated by the reference numeral 10 will be described.

The present invention, designated as numeral 10, includes a horizontally oriented base 12 having a planar rectangular configuration with a top face, a bottom face and a periphery formed therebetween. Such periphery is defined by a pair of parallel elongated edges and a pair of parallel short edges formed therebetween. The bottom face further includes a swivel wheel 14 mounted to each of the corners thereof for transporting purposes.

Figure 4:
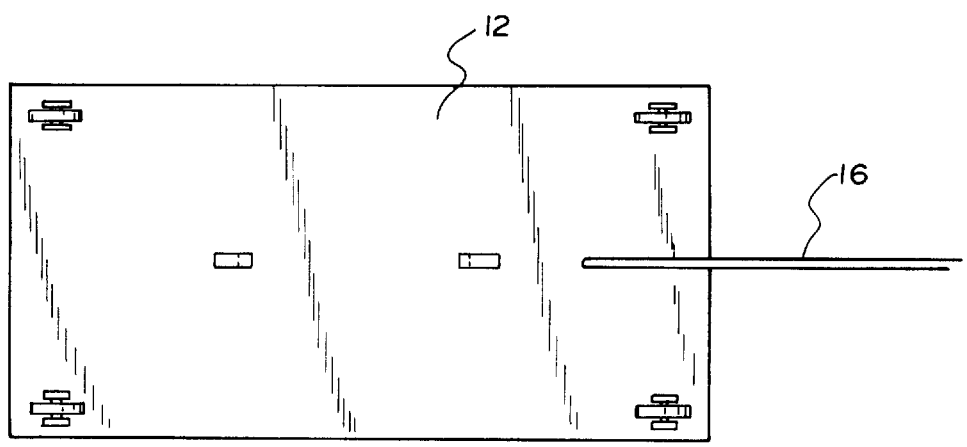
FIG. 4 is a bottom view of the present invention.

To further facilitate transporting of the present invention, a rope 16 is connected to the bottom face of the base adjacent to one of the short edges and terminating in a loop. For providing a means of storing the rope, a pair of L-shaped brackets depend from the bottom face of the base, as shown in FIG. 4.

Figure 2:
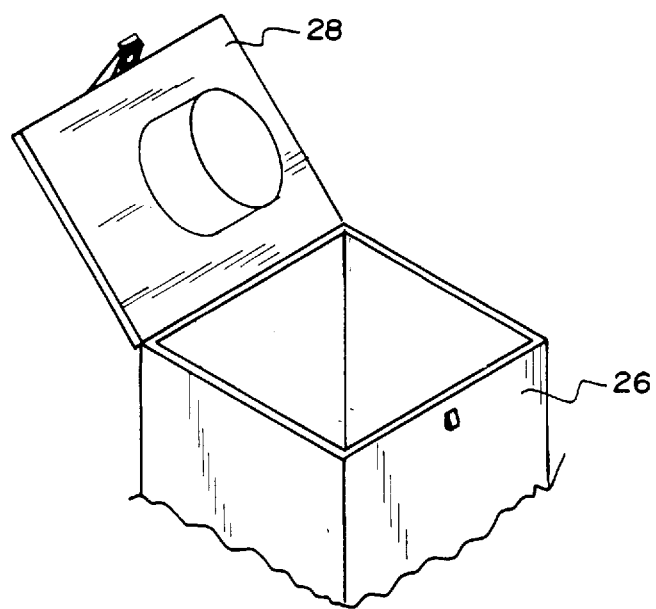
FIG. 2 is a detailed view of one of the side walls of the second side portion of the present invention.
Figure 3:
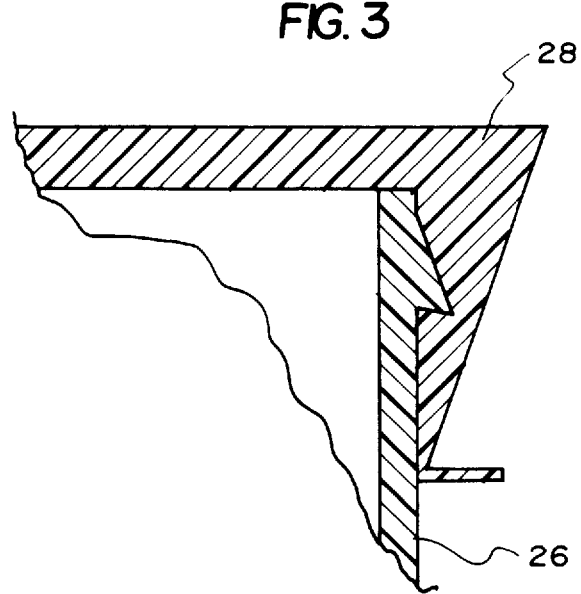
FIG. 3 is a cross-sectional view of the present invention taken along line 3—3 shown in FIG. 1.

As shown in FIG. 2, a first side portion 18 is provided including a peripheral lip coupled to the base and extending upwardly therefrom a first predetermined height. Associated therewith is an intermediate lip 20 integrally coupled to the top face of the base and extended upwardly therefrom the first predetermined height. The intermediate lip is situated in parallel relationship with and adjacent to a portion of the peripheral lip mounted along one of the elongated edges of the base. The lips define a first shallow compartment with an open top and a first width for supporting a tool box and a second shallow compartment with an open top and a second width less than ¼ the first width for containing hardware. See FIG. 1.

Situated opposite the first side portion is a second side portion 22 having a pair of square side walls each having a square horizontal cross section. The square side walls are situated in a side-by-side relationship between the elongated edges and contiguous with one of the short edges of the base. The square side walls each define an open top and separate compartments including a spray bottle container. The square side walls include a short side wall 24 and a tall side wall 26. The tall side wall is equipped with a height at least twice that of the short side wall and at least four times the first predetermined height. It should be noted from the Figures that a length of the second side portion is less than ¼ that of the first side portion.

Finally, a square lid 28 has a first side edge hingably coupled to an upper peripheral edge of the open top of the tall side wall for pivoting between an opened and a closed orientation. The square lid 30 has a cylindrical recess formed therein for containing a beverage or the like therein.

Figure 5:
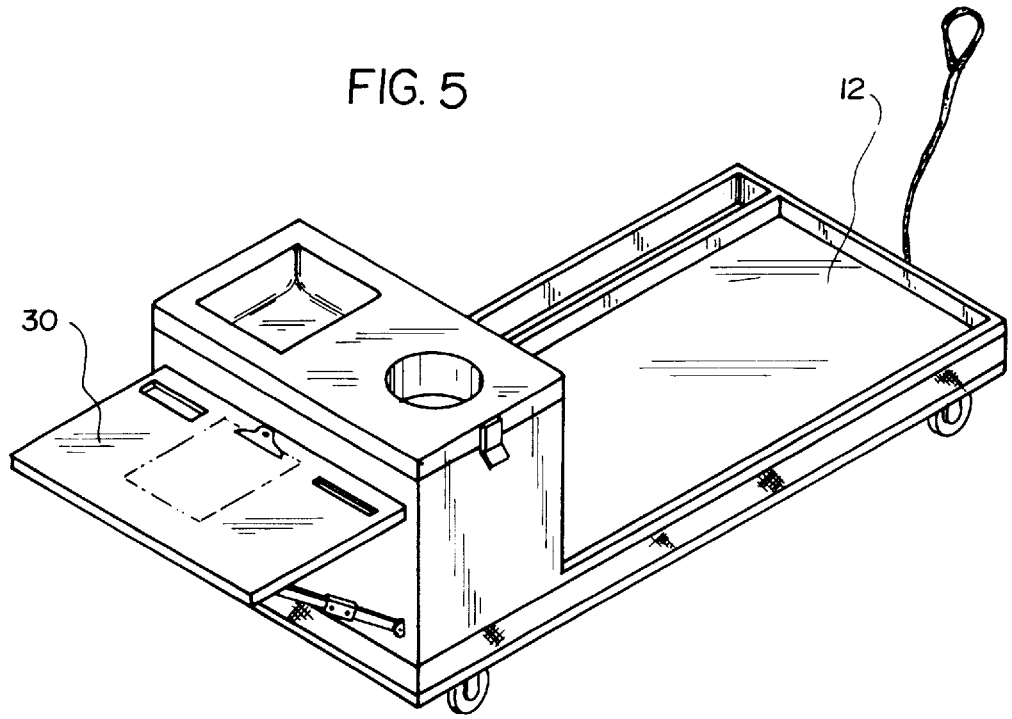
FIG. 5 is a perspective view of an alternate embodiment of the present invention.
Figure 6:
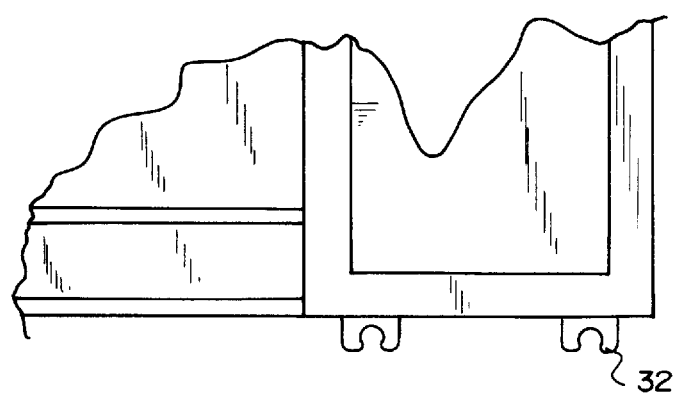
FIG. 6 is a sectional view of a portion of the embodiment of the present invention shown in FIG. 5.

In an alternate embodiment, as shown in FIGS. 5 & 6, the forgoing side walls are replaced with a single side wall. An open top defined by the single side wall is covered by an enlarged lid having both a rectangular and cylindrical recess. Further, a collapsible shelf 30 is extended from an outer surface of the side wall and extendible away from the base between a collapsed and horizontal orientation. Lastly, as shown in FIG. 6, a pair of resilient C-shaped couples 32 are mounted on the second side portion for releasably securing to any one of a plurality of various tools. Further options include a plurality of unillustrated retractable drawers formed in the side wall.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tool transport assembly comprising, in combination:

a horizontally oriented base having a planar rectangular configuration with a top face, a bottom face and a periphery formed therebetween defined by a pair of parallel elongated edges and a pair of parallel short edges formed therebetween, the bottom face further including a swivel wheel mounted to each of the corners thereof for transporting purposes, wherein a rope is connected to the bottom face of the base adjacent to one of the short edges and terminating in a loop for totting purposes;

a first side portion including a peripheral lip coupled thereto and extending upwardly therefrom a first predetermined height and an intermediate lip integrally coupled to the top face of the base and extending upwardly therefrom the first predetermined height, the intermediate lip being situated in parallel relationship with and adjacent to a portion of the peripheral lip mounted along one of the elongated edges of the base, wherein the lips define a first shallow compartment with an open top and a first width and a second shallow compartment with an open top and a second width less than ¼ the first width;

a second side portion having a pair of square side walls each having a square horizontal cross section and situated in side-by-side relationship between the elongated edges and contiguous with one of the short edges of the base, the square side walls each defining an open top and a separate compartment, the square side walls including a short side wall and a tall side wall with a height at least twice that of the short side wall and at least four times the first predetermined height, wherein a length of the second side portion is less than ¼ that of the first side portion; and a square lid having a first side edge hingably coupled to an upper peripheral edge of the open top of the tall side wall for pivoting between an opened and a closed orientation, the square lid having a cylindrical recess formed therein for containing a beverage or the like therein.

2. A tool transport assembly comprising:

a base including a wheel mounted to each of the corners thereof for transporting purposes;

a first side portion including a peripheral lip coupled to the base and extending upwardly therefrom a first predetermined height for defining a shallow compartment with an open top;

a second side portion having at least one side wall defining an open top, the side wall equipped with a height at least four times the first predetermined height.

3. A tool transport assembly as set forth in claim 2 wherein the side wall includes a short side wall and a tall side wall each defining a separate compartment.

4. A tool transport assembly as set forth in claim 2 wherein the side wall has a lid hingably coupled thereon.

5. A tool transport assembly as set forth in claim 4 wherein the lid has a recess formed therein for removably receiving a beverage container therein.

6. A tool transport assembly as set forth in claim 2 wherein a length of the second side portion is less than ¼ that of the first side portion.

7. A tool transport assembly as set forth in claim 2 wherein the first side portion has an intermediate lip integrally coupled to a top face of the base and extending upwardly therefrom the first predetermined height, the intermediate lip being situated in parallel relationship with and adjacent to a portion of the peripheral lip, wherein the lips define a first shallow compartment with an open top and a first width and a second shallow compartment with an open top and a second width less than ¼ the first width.

8. A tool transport assembly as set forth in claim 2 wherein a rope is connected to the base for totting purposes.

9. A tool transport assembly as set forth in claim 2 wherein the second side portion has a shelf hingably coupled thereto and selectively maneuvered between a horizontal and vertical orientation.

* * * * *